(12) United States Patent
Park et al.

(10) Patent No.: US 9,886,011 B2
(45) Date of Patent: Feb. 6, 2018

(54) PORTABLE DEVICE AND METHOD FOR CONTROLLING THE PORTABLE DEVICE BY MAGNETIC FIELD VARIATION USING DETACHABLE PEN

(71) Applicant: Samsung Electronics Co. Ltd., Suwon-si, Gyeonggi-do (KR)

(72) Inventors: Hyungjin Park, Yongin-si (KR); Hyunju Hong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 600 days.

(21) Appl. No.: 14/059,991

(22) Filed: Oct. 22, 2013

(65) Prior Publication Data

US 2014/0180481 A1    Jun. 26, 2014

(30) Foreign Application Priority Data

Dec. 24, 2012    (KR) .......................... 10-2012-0151762

(51) Int. Cl.
*G05B 15/02*    (2006.01)
*G06F 3/0487*    (2013.01)
*G06F 3/0354*    (2013.01)

(52) U.S. Cl.
CPC ......... *G05B 15/02* (2013.01); *G06F 3/03545* (2013.01); *G06F 3/0487* (2013.01); *G06F 2200/1632* (2013.01)

(58) Field of Classification Search
CPC ... G05B 15/02; G06F 3/0487; G06F 3/03545; G06F 2200/1632
See application file for complete search history.

(56) References Cited

U.S. PATENT DOCUMENTS

| 4,626,781 | A  | * | 12/1986 | Forkel | B60T 8/171 |
| | | | | | 310/155 |
| 5,973,677 | A  | * | 10/1999 | Gibbons | G06F 1/1626 |
| | | | | | 178/18.04 |
| 2004/0135765 | A1 | * | 7/2004 | Kinerk | G06F 1/1626 |
| | | | | | 345/156 |
| 2004/0212586 | A1 | * | 10/2004 | Denny, III | G06F 1/1626 |
| | | | | | 345/156 |
| 2007/0103455 | A1 | | 5/2007 | Omata et al. | |
| 2008/0036747 | A1 | | 2/2008 | Hope | |
| 2008/0202898 | A1 | | 8/2008 | Cheon et al. | |
| 2009/0108837 | A1 | * | 4/2009 | Johansson | G01D 5/145 |
| | | | | | 324/207.25 |
| 2010/0045626 | A1 | | 2/2010 | Nicolas et al. | |

(Continued)

FOREIGN PATENT DOCUMENTS

| KR | 10-2000-0073578 A | 12/2000 |
| KR | 10-2007-0016330 A | 2/2007 |
| RU | 2 444 147 C2 | 2/2012 |

*Primary Examiner* — Liliana Cerullo
(74) *Attorney, Agent, or Firm* — Jefferson IP Law, LLP

(57) ABSTRACT

A method of controlling a portable device based on variation of a magnetic field by a detachable pen attached to the portable device and a portable device thereof is provided. The method includes detecting variation of a magnetic field due to at least one of an attaching, a detaching, and a rotation of the pen, determining whether there is a control operation corresponding to the variation of the magnetic field, and performing the control operation corresponding to the variation of the magnetic field when there is the control operation.

20 Claims, 9 Drawing Sheets

(56) References Cited

U.S. PATENT DOCUMENTS

| | | | | |
|---|---|---|---|---|
| 2010/0053113 A1* | 3/2010 | Wu | ......................... | G06F 3/044 345/174 |
| 2011/0285671 A1* | 11/2011 | Wu | ....................... | G06F 1/1626 345/179 |

* cited by examiner

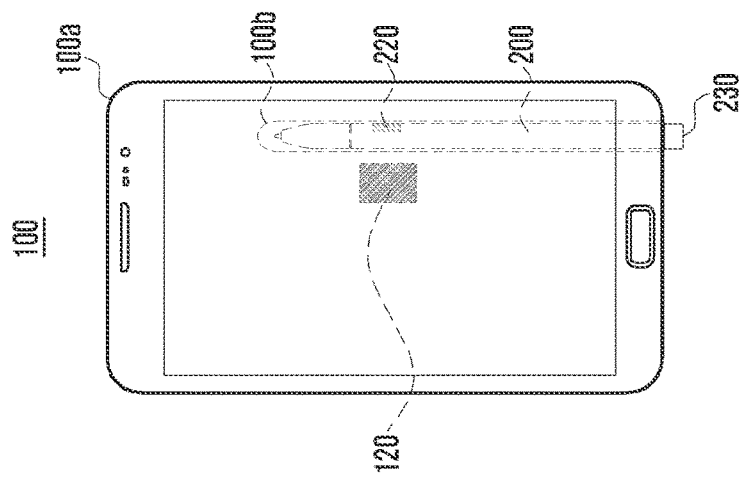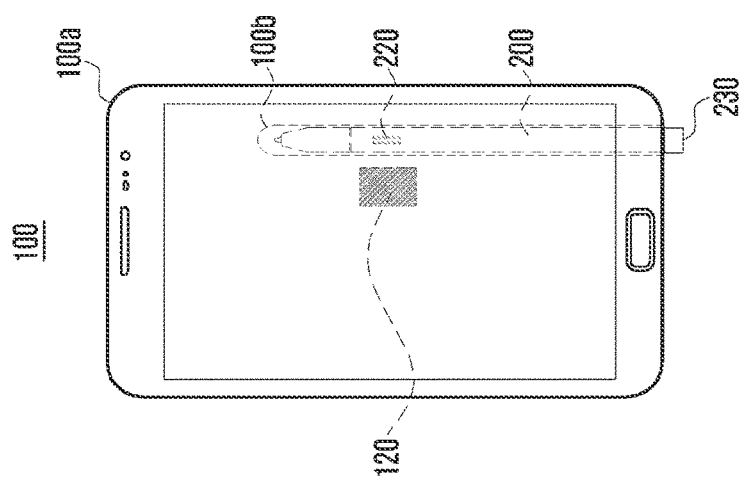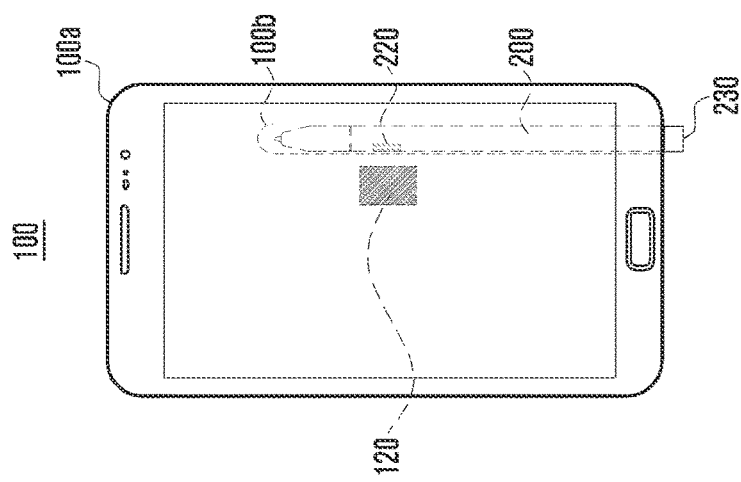

PORTABLE DEVICE AND METHOD FOR CONTROLLING THE PORTABLE DEVICE BY MAGNETIC FIELD VARIATION USING DETACHABLE PEN

PRIORITY

This application claims the benefit under 35 U.S.C. § 119(a) of a Korean patent application filed on Dec. 24, 2012 in the Korean Intellectual Property Office and assigned Serial No. 10-2012-0151762, the entire disclosure of which is hereby incorporated by reference.

BACKGROUND OF THE INVENTION

1. Field of the Invention

The present invention relates to a method of controlling a portable device and a portable device thereof. More particularly, the present invention relates to a method of controlling a portable device based on variation of a magnetic field by a detachable pen attached to the portable device and a portable device thereof.

2. Description of the Related Art

A portable device according to the related art is configured to perform complex functions such as capturing photographs or moving images, playing a music file or a moving file, enabling a user to play games, receiving broadcasting, and supporting of wireless Internet, and is implemented in the form of a composite multimedia player. Accordingly, in order to reinforce portability and convenience while satisfying the need of a user, the portable device has been in a new form in terms of a hardware or software. The detachable pen attached to the portable device has been used as auxiliary means capable of conveniently controlling various function of the portable device. The portable device detects input by the pen and controls various functions of the portable device according to the detected input.

As the control of the portable device through the input of the pen is generalized, a hole is formed at the portable device so that the pen is detachably attached in the hole so as to prevent the pen from being lost. The detachable pen attached to the portable device may provide various utilization possibilities. However, the hole in which the detachable pen is attached is used for preventing loss but is not used for other applications.

Therefore, a need exists for an apparatus and method for controlling a portable device which controls a preset function of the portable terminal corresponding to a value of a magnetic field based on variation due to attaching and detaching of the detachable pen.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention is to provide a method of controlling a portable device which controls a preset function of the portable terminal corresponding to a value of a magnetic field based on variation due to attaching and detaching of the pen, and a portable device thereof.

Another aspect of the present invention is to provide a method of controlling a portable device which controls a function of the portable terminal based on variation of a magnetic field due to rotation of a pen attached to the portable device, and a portable device thereof.

In accordance with an aspect of the present invention, a method of controlling a portable to a pen is detachably attached is provided. The method includes detecting variation of a magnetic field due to at least one of an attaching, a detaching, and a rotation of the pen, determining whether a control operation corresponding to the variation of the magnetic field exists, and performing the control operation, when the control operation corresponding to the variation of the magnetic field exists.

In accordance with another aspect of the present invention, the method further includes receiving the control operation according to the variation of the magnetic field when a control operation setting request corresponding to the variation of the magnetic field is generated, and setting the control operation corresponding to the variation of the magnetic field according to the reception of the control operation.

In accordance with another aspect of the present invention, the setting of the control operation includes setting the control operation corresponding to the variation of the magnetic field according a preset initial value when the control operation setting request corresponds to a reset request.

In accordance with another aspect of the present invention, the detecting of the variation of the magnetic field includes displaying an indicator corresponding to the variation of the magnetic field.

In accordance with another aspect of the present invention, the determining of whether a control operation corresponding to the variation of the magnetic field exists includes determining the variation of the magnetic field, and determining at least one of an intensity of the magnetic field, a variation amount of the magnetic field, a detaching of the pen, an attaching of the pen, a detached state of the pen, rotation information, and a level of the magnetic field of the pen, according to the determined variation of the magnetic field.

In accordance with another aspect of the present invention, the determining of whether a control operation corresponding to the variation of the magnetic field exists includes determining whether a preset time elapses after the variation of the magnetic field is detected, and determining, when the preset time elapses, whether a control operation corresponding to the variation of the magnetic field exists.

In accordance with another aspect of the present invention, the determining of whether a control operation corresponding to the variation in the magnetic field exists includes determining, when the preset time has not elapsed whether a variation of new magnetic field is generated by the pen, determining, when the variation of the new magnetic field is generated, the rotation information of the pen based on the variation of the magnetic field and the variation of new magnetic field, and determining whether the control operation corresponding to the rotation information of the pen exists.

In accordance with another aspect of the present invention, the determining of whether a control operation corresponding to the variation of the magnetic field exists includes determining a currently driven application, and determining whether a control operation corresponding to the variation of the magnetic field exists with respect to the currently driven application.

In accordance with another aspect of the present invention, the performing of the control operation includes performing at least one of executing a function provided from the portable device, driving a specific application, executing a function provided to an application, and setting a mode for the application.

In accordance with another aspect of the present invention, the detecting of the variation of the magnetic field includes: entering a sleep mode, driving a sensor hub according to the entering the sleep mode to supply power to the sensor, and detecting the variation of the magnetic field by the sensor.

In accordance with another aspect of the present invention, the performing of the control operation includes: releasing the sleep mode, and performing the control operation corresponding to the variation of the magnetic field.

In accordance with another aspect of the present invention, a portable device to which a pen is detachably attached is provided. The device includes a hole in which the pen is detachably attached and which is formed to allow the pen to be rotated when the pen is in an attached state, a sensor installed in proximity (e.g., adjacent) to the hole to detect variation of a magnetic field by the pen, and a controller for determining whether a control operation corresponding to the variation of the magnetic field detected by the sensor exists, and for performing the control operation when the control operation corresponding to the variation of the magnetic field exists.

In accordance with another aspect of the present invention, a portable device further includes an input unit for receiving a control operation setting request and a control operation corresponding to the variation of the magnetic field, wherein the controller sets the control operation corresponding to the variation of the magnetic field according to the received control operation when the control operation setting request is received through the input unit.

In accordance with another aspect of the present invention, a portable device further includes a reset button for setting the control operation according to a preset initial value, wherein the controller sets the control operation corresponding to the variation of the magnetic field according to the preset initial value when the reset button is operated.

In accordance with another aspect of the present invention, a portable device further includes a display unit for displaying an indicator corresponding to the variation of the magnetic field when the variation of the magnetic field is detected.

In accordance with another aspect of the present invention, the controller determines the variation of the magnetic field, and determines at least one of an intensity and a variation amount of the magnetic field, a detaching of the pen, an attaching of the pen, a detached state of the pen, rotation information and a level of the magnetic field in the pen.

In accordance with another aspect of the present invention, the controller determines whether a preset time elapses after the variation of the magnetic field is detected, and determines, when the preset time elapses, whether a control operation corresponding to the variation of the magnetic field exists.

In accordance with another aspect of the present invention, the controller determines, when the preset time has not elapsed, whether variation of a new magnetic field by the pen is generated, determines, when the variation of the new magnetic field is generated, the rotation information of the pen based on the variation of the magnetic field and the variation of the new magnetic field, and determines whether the control operation corresponding to the rotation information exists.

In accordance with another aspect of the present invention, the portable device further includes a sensor hub for supplying power to the sensor when the controller control the portable device so that the portable device operates in a sleep mode, wherein the sensor receives the power from the sensor hub when the portable device operates in the sleep mode to detect the variation of the magnetic field.

In accordance with another aspect of the present invention, the pen includes a magnet installed in a location biased to one surface from a center axis of a pen holder, and a dial for rotating the pen and the magnet installed at the pen.

In accordance with another aspect of the present invention, a non-transient compute readable storage medium is provided. The non-transient computer-readable storage medium stores instructions that when executed causes at least one processor to perform a method including detecting variation of a magnetic field due to at least one of an attaching, a detaching, and a rotation of the pen, determining whether a control operation corresponding to the variation of the magnetic field exists, and performing the control operation, when the control operation corresponding to the variation of the magnetic field exists.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 5 to 7 are views illustrating an example of a pen attached to a portable terminal according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

Exemplary embodiments of the present invention provide an apparatus and method for controlling a portable device to which a detachable pen is attached.

According to exemplary embodiments of the present invention, a portable device to which a detachable pen is attached includes a general electronic terminal such as a smart phone, a portable terminal, a mobile terminal, a Personal Digital Assistant (PDA), a Portable Multimedia Player (PMP) terminal, a note pad, a Wibro terminal, and a tablet Personal Computer (PC) as well as various devices to which a pen is detached.

Figure 1:
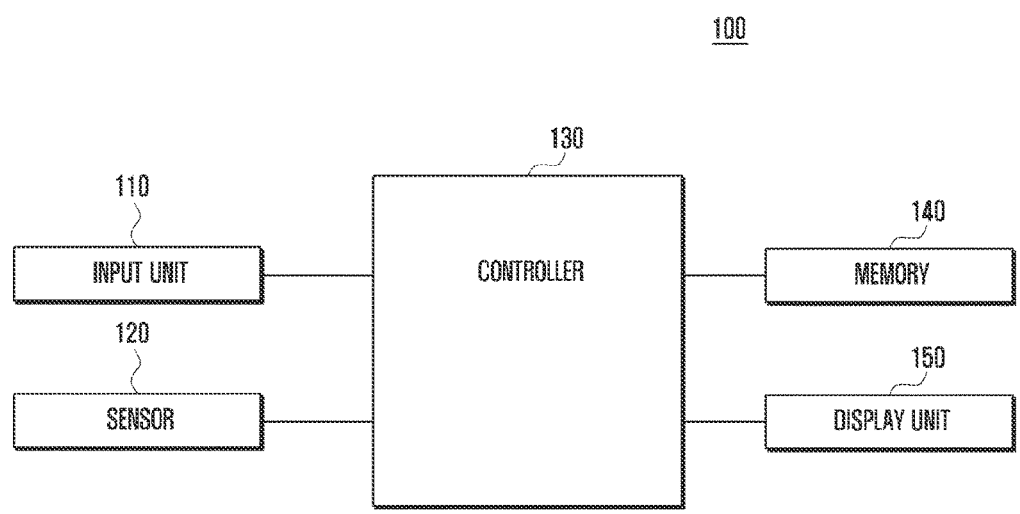
FIG. 1 is a block diagram illustrating a configuration of a portable device according to an exemplary embodiment of the present invention.

FIG. 1 is a block diagram illustrating a configuration of a portable device according to an exemplary embodiment of the present invention.

Referring to FIG. 1, the portable device 100 may include an input unit 110, a sensor 120, a controller 130, a memory 140, and a display unit 150.

The input unit 110 detects input of a user, and sends an input signal corresponding to the user input to the controller 130. The input unit 110 may include a key pad, a dome switch, a touch pad (resistive/capacitive type), a jog wheel, a jog switch, a finger mouse, a wheel, and the like.

The input unit 110 may include a touch sensor, a proximity sensor, an electromagnetic sensor, a pressure sensor, and the like. The input unit 110 may detect touch input or proximity input of the user through the sensor 120. The input unit 110 may be configured by a sensor on a pad in the form of a film or an input pad coupled on the pad in the form of a panel. For example, the input unit 110 may be configured by an input pad of an Electro Magnetic Resonance (EMR) or Electro Magnetic Interference (EMI) scheme using the electromagnetic sensor.

The input unit 110 may have a mutual layer structure with a display unit 150 and operate as an input screen. For example, the input unit 110 may be configured by a Touch Screen Panel (TSP) which includes an input pad having a touch sensor and is coupled with the display unit 150. The input unit 100 forming a layer structure with the display unit 150 may be referred to as a touch screen.

According to exemplary embodiments of the present invention, the input unit 110 may receive an on/off setting of a control mode according to variation of a magnetic field. The input unit 110 may receive a control operation setting request corresponding to the variation of the magnetic field and a control operation with respect to the variation of the magnetic field.

According to exemplary embodiments of the present invention, the input unit 110 detects input in connection with the sensor 120 as a capacitive pen or an electrostatic pen.

The sensor 120 is configured by a plurality of sensors to detect a current state of the portable device 100. The sensor 120 may generate a control signal corresponding to the detected state and send the control signal to the controller 130.

According to exemplary embodiments of the present invention, the sensor 120 may include a geomagnetic sensor. The geomagnetic sensor measures magnetic intensity of at least two axes (e.g., two axes or three axes) to measure magnitude and a direction of a magnetic field influencing on the geomagnetic sensor as a vector addition of the measure magnetic field intensity.

According to exemplary embodiments of the present invention, the sensor 120 may detect variation of a magnetic field caused by the pen. To this end, the sensor 120 may be installed adjacent to a hole to which the pen is attached and detached. The sensor 210 may include a plurality of geomagnetic sensors. For example, the sensor 120 may further include a geomagnetic sensor for detecting input through the input unit 110 and a geomagnetic sensor for detecting variation of the magnetic field caused by the pen.

According to exemplary embodiments of the present invention, the sensor 120 may consume minimum power to receive power from a sensor hub driving a device. Accordingly, when the portable device 100 operates in a sleep mode, the sensor 120 may detect a state variation such as variation of a magnetic field of the portable device 100.

In addition, the sensor 120 may include at least one of a touch sensor, a proximity sensor, an electromagnetic sensor, a pressure sensor, a motion sensor, an acceleration sensor, a tilt sensor, and the like.

The controller 130 may control respective constituent elements for an overall operation of the portable device 100. For example, the controller 130 may control a function provided from the portable device 100 based on the variation of the magnetic field detected through the sensor 120.

According to exemplary embodiments of the present invention, the controller 130 may control the portable device 100 to perform a control operation corresponding to the variation of the magnetic field detected by the sensor 120 according to the variation of the magnetic field. The controller 130 analyzes the variation of the magnetic field detected by the sensor 120, and determines at least one of intensity of the magnetic field, variation of the magnetic field, attaching or detaching of the pen, a detached state of the pen, rotation information of the pen and a level of the magnetic field, according to the analysis result. If, according to the determination result, an operation corresponding to the variation of the magnetic field exists, the controller 130 may control respective constituent elements of the portable terminal 100 to perform a corresponding operation.

A detailed operation of the controller 130 is described below with reference to the drawings.

The memory 140 may store programs and commands for the portable device 100. The controller 130 may perform the programs or commands stored in the memory 140.

According to exemplary embodiments of the present invention, the memory 140 may include at least one storage medium among a flash memory type, a hard disk type, a multimedia card micro type, card type memory (e.g., SD or XD memory, and the like), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a Magnetic memory, a Magnetic disk, an Optical disk, and the like.

According to exemplary embodiments of the present invention, the memory 140 stores information about a control operation corresponding to the variation of the magnetic field. The memory 140 may store information about intensity, variation, and a level of the magnetic field which is changed by the pen (e.g., which may be changed based on an attached/detached state of the pen).

The display unit 150 displays (outputs) information processed by the portable device 100. For example, the display unit 150 may display information corresponding to a currently driven application, program, or service together with User Interface (UI) or Graphic User Interface (GUI).

The display unit 150 forms a layer structure with the input unit 110 and the sensor 120 and may operate as a touch screen. In this case, the display unit 150 operating as the touch screen may perform a function of an input device.

According to exemplary embodiments of the present invention, the display unit 150 may display an image, an icon, an indicator, and an alarm window corresponding to variation of the magnetic field under the control of the controller 130. Because constituent elements shown in FIG. 1 are not essential, a portable device 100 having more or less constituent elements may be implemented.

Hereinafter, a portable device 100 to which a pen is detachably attached and the pen will be described in detail.

Figure 2:
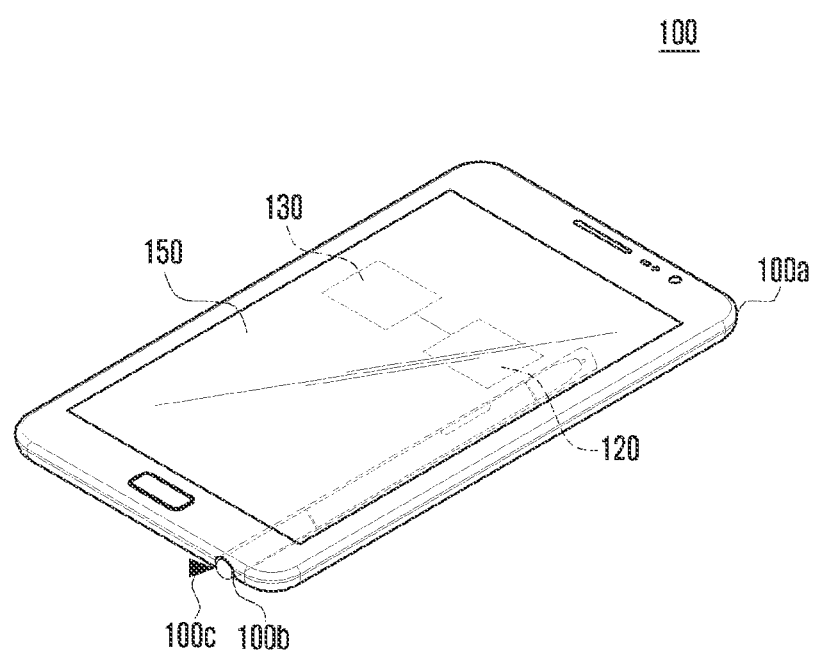
FIG. 2 is a perspective view illustrating a portable terminal according to an exemplary embodiment of the present invention.

FIG. 2 is a perspective view illustrating a portable terminal according to an exemplary embodiment of the present invention.

Referring to FIG. 2, the portable device 100 according to exemplary embodiments of the present invention is configured by a case 100a forming an outer appearance. Respective constituent elements may be embedded in an internal space formed by the case 100a. At least one center case may be further disposed at the internal space of the space 100a. The display unit 150 may be disposed on (e.g., integrated with) the case 100a. In addition, a camera, a sound output unit, a microphone, an input unit 110, and/or the like may be disposed on (e.g., integrated with) the case 100a.

According to the exemplary embodiments of the present invention, the display unit 150 is implemented by a touch screen capable of detecting input by a capacitive or constant voltage pen. In this case, the display unit 150 may perform a function of the input unit 110. The display unit 150 implemented by the touch screen may detect approach or contact of the pen through variation of the magnetic field. The pen generating input through the display unit 150 will be described with reference to FIG. 3.

A camera may be implemented to capture a photograph or a moving image. The sound output unit may be implemented in the form of a receiver or a speaker. A microphone may be implemented to receive a voice or a sound of the user. The input unit 110 provided at the case 100a may be implemented by a dome switch or a touch pad capable of receiving a command or information by a push or touch operation of the user, or may be implemented by a wheel or jog scheme of rotating a key or a jog stick. In terms of function, the input unit 100 may be operated as an input of a command such as start, end, and scroll or as a hot key for activating a specific function in the portable device 100.

According to exemplary embodiments of the present invention, a hole 100b serving as a space for detachably attaching the pen is formed at an internal space between the case 100a and the portable device 100 surrounded by the case 100a. For example, the hole 100b may be formed so as to allow the pen to be selectively inserted therein. A plurality of grooves or protrusions are formed in the hole 100b such that the pen is fixed in the hole 100b at a given location and in a given attached state.

According to exemplary embodiments of the present invention, the sensor 120 is provided inside of the case 100a. The sensor 120 includes at least one geomagnetic sensor to detect variation of a magnetic field by a pen inserted into the hole 100b. The geomagnetic sensor is provided adjacent to the hole 100b. If the variation of the magnetic field by the pen is detected, the sensor 120 generates a control signal with respect to the detected variation of the magnetic field and sends the control signal to the controller 130.

The sensor 120 detects the variation of the magnetic field caused by attaching or detaching the pen 200. When the pen is attached, the sensor 120 detects variation of the magnetic field according to a distance between the pen and a magnet 220 installed in the pen 200. The sensor 120 detects continuous variation of the magnetic field by rotation of the attached pen. The varied magnetic field may have a plurality of levels classified according to an intensity or a direction of the magnetic field.

In addition, an indicator 100c may be displayed around the hole 100b to indicate an installed direction of the sensor 120 or a distance information between a magnet installed in the pen and the sensor 120. The indicator 100c may be configured so as to use a bar, an arrow, a dot, and the like for indicating a location of the sensor 120. The indicator 100c may indicate a distance between the magnet and the sensor 120. A location of the magnet installed in the pen is changed according to an attached state of the pen to the portable device 100 or rotation of the attached pen. Accordingly, the distance between the magnet and the sensor 120 is changed so that a variation amount of the magnetic field detected by the sensor 120 may be changed. The indicator 100c may be configured by a variation amount or a level of the magnetic field detected by the sensor 120. The indicator 100c may be configured by numerals and characters designated to n divided directions according to the number of levels of the magnetic field.

The perspective view of the portable device 100 shown in FIG. 2 is merely an example of implementing the exemplary embodiment of the present invention. However, according to exemplary embodiments of the present invention, the portable device 100 may have various shapes and structures according to the implementation.

Figure 3:
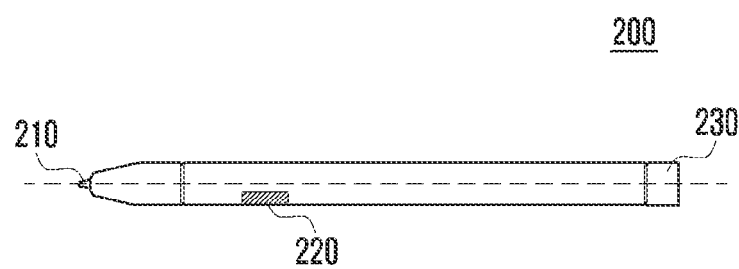
FIG. 3 is a side view illustrating a detachable pen attached to and from a portable device according to an exemplary embodiment of the present invention.

FIG. 3 is a side view illustrating a detachable pen attached to and from a portable device according to an exemplary embodiment of the present invention.

Referring to FIG. 3, the pen 200 may be implemented in a capacitive scheme or a constant voltage scheme so that input is generated through a touch screen using variation of a magnetic field.

The pen 200 may be inserted into the hole 100b which is formed at the case 100a of the portable device 100. A groove or a protrusion may be formed in the inside of the hole 100b to which the pen 200 is inserted or may be formed at the pen 200 so that the pen may be fixed to the groove or the protrusion in a specific state.

A pen nib 210 is formed at a front surface of the pen 200 which is made of a conductive material and generates variation of the magnetic field.

A magnet 220 is installed in the inside of the pen 200. The magnet 220 is mounted at a location biased to one surface with respect to a center axis of the pen 200. The magnet 220 generates variation of the magnetic field around the pen 200. According to exemplary embodiments of the present invention, when the pen 200 is detached from or attached to the portable device 100, the magnet 220 generates a variation of the magnetic field around the pen 200. When the pen 200 is rotated, the magnet 220 generates the variation of the magnetic field around the pen 200.

The sensor 120 installed in the portable device 100 detects the variation of the magnetic field by the magnet 220. The sensor 120 may detect different magnetic fields according to an attached state of the pen 200 or according to a rotation of the attached pen 200.

The foregoing exemplary embodiment has illustrated that the pen 200 having the magnet 220 generates the variation of the magnetic field. However, exemplary embodiments of the present invention are not limited thereto. For example, various conductive materials capable of generating the variation of the magnetic field may be used.

According to exemplary embodiments of the present invention, a dial 230 may be formed at an end of the pen 200. A user may rotate the pen 200 using the dial 230. The dial 230 may be configured by a jog dial, a jog wheel, a scroll, and the like. A groove or a protrusion may be formed at the dial 230 to cause the rotated dial 230 to be fixed in a specific rotation state.

Figure 4:
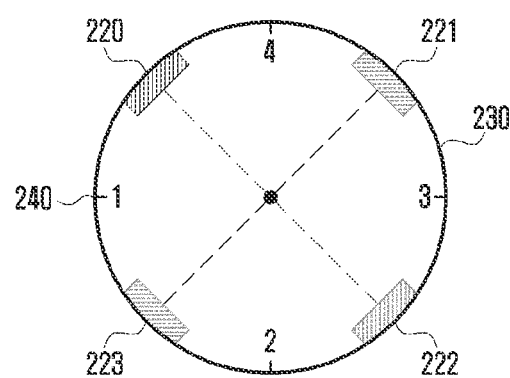
FIG. 4 is a rear view illustrating a detachable pen attached to a portable terminal according to an exemplary embodiment of the present invention.

FIG. 4 is a rear view illustrating a detachable pen attached to a portable terminal according to an exemplary embodiment of the present invention.

Referring to FIG. 4, an indicator for indicating distance information between the magnet 220 and the sensor 120 may be displayed at the dial 230. The magnet 220 is moved inside the portable device 100 according to the attached state of the pen 200 to the portable device 100 or rotation of the attached pen 200. Accordingly, a distance between the magnet 220 and the sensor 120 is changed, and the amount of the magnetic field detected by the sensor 120 is varied. The indicator may indicate a distance between the magnet 220 and the sensor 120. For example, the indicator may indicate the variation amount of the magnetic field detected by the sensor 120.

The variation amount of the magnetic field may be expressed as a level of the magnetic field, and the indicator may be configured by the level of the magnetic field. The level of the magnetic field may be indicated by an optional number (e.g., a reference indicator number), and may be differently formed according to a manufacturing technology of the pen 200, a sensitivity of the sensor 120, and a size and a shape of the magnet 220. The indicator may be configured using (e.g., represented by) a numeral, a character, an image, and the like.

As illustrated in FIG. 4, a reference indicator of 1 may correspond to (e.g., indicate) a case in which the magnet 220 is located closest to the sensor 120. For example, the reference indicator of 1 may indicate a case in which the largest variation amount of the magnetic field is detected by the sensor. Conversely, a reference indicator of 3 may indicate the case in which the magnet 220 is located at the farthest position away from the sensor 120. For example, the reference indicator of 3 may indicate a case in which the smallest variation amount of the magnetic field is detected by the sensor caused by the magnet 220. In contrast, a reference indicator of 2 or 4 may correspond to (e.g., indicate) the case in which the magnet 220 is located at a position between the closest location to the sensor 120 indicated by reference indicator 1 and the farthest position away from the sensor 120 indicated by reference indicator 3. A position 221 and a position 222 may correspond to farther positions relative to a position when the magnet is located closest to the sensor. A position 223 may correspond to a closer position relative to the configurations when the magnet is located at farther positions 221 and 222.

Figure 8:
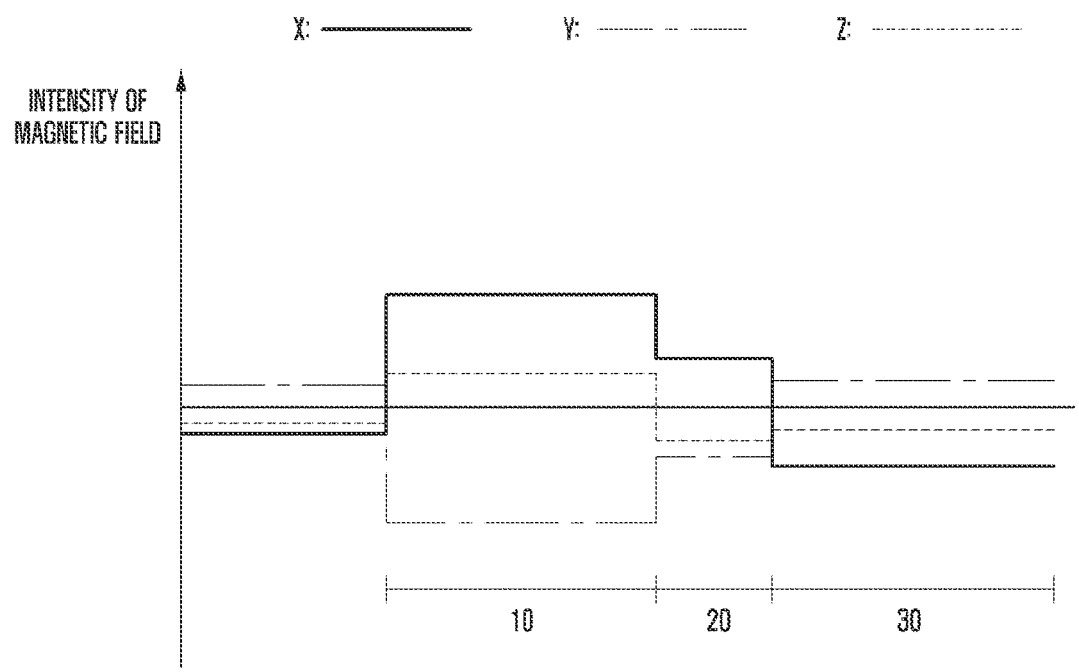
FIG. 8 is a graph illustrating variation of a magnetic field created as a pen is attached and detached according to an exemplary embodiment of the present invention.

FIGS. 5 to 7 are views illustrating an example of a pen attached to a portable terminal according to an exemplary embodiment of the present invention. FIG. 8 is a graph illustrating variation of a magnetic field created as a pen is attached and detached according to an exemplary embodiment of the present invention.

Referring to FIGS. 5 to 7, a pen 200 is inserted into to case 110a via the hole 110b which is formed in the portable device 100 according to exemplary embodiments of the present invention. The magnet 220 is installed inside the pen 200 to be biased from a center axis of the pen to one surface. A sensor 120 is installed adjacent to the magnet 220 in the portable device 100. The sensor 120 detects attaching and detaching states of the pen 200 or a variation of a magnetic field due to rotation of the pen 200. For example, the sensor 120 may detect an attached state or a detached state based on a variation of the magnetic field resulting from the rotation of the pen 200. The pen 200 may be inserted into the hole 110b such that the pen nib 210 is inserted further into the hole 110b than the dial 230.

FIG. 5 is a diagram illustrating an example of inserting a pen 200 in the portable device 100 so that the magnet 200 is located closest to the sensor 120 according to an exemplary embodiment of the present invention.

Referring to FIG. 8, if the magnet 220 is located closest to the sensor 120, the largest variation amount of a magnetic field is detected by the sensor 120 as illustrated in a first section 10. If the variation of the magnetic field is detected, the sensor 120 may generate a control signal according to the detection of the variation of the magnetic field and send the control signal to the controller 130.

FIG. 6 is a diagram illustrating an example where the magnet 220 is located gradually farther away from the sensor 120 according to an exemplary embodiment of the present invention.

The magnet may be located farther away from the sensor 120 according to an attached state of the pen 200 or rotation of an inserted pen 200. As illustrated in FIG. 6, the magnet may move in a forward direction of the portable device 100 and be located far away from the sensor 120. The magnet 220 may move in a rear direction of the portable device 100. In this case, as illustrated in a second section 20 of FIG. 8, a variation amount of a magnetic field detected by the sensor 120 becomes smaller than when the magnet 220 is located closest to the sensor 120.

When the magnet 220 moves in the forward direction or the rear direction of the portable device 100, a straight line from the magnet 220 to the sensor 120 is the same. In this case, the controller 130 cannot exactly determine the attached state of the pen 200 by using only the variation of the magnetic field detected by the sensor 120. In order to solve the problem, according to the exemplary embodiments of the present invention, a distance between the sensor 120 and the magnet when the magnet 220 is located at a front surface of the portable device 100 may be different from a distance between the sensor 120 and the magnet when the magnet 220 is located at a rear surface of the portable device 100.

For example, referring to FIG. 4, when a reference indicator of 2 faces the sensor 120, the magnet 200 is not completely located at a rear surface of the portable device 100 but is located at a farther position 221 away from the rear surface. When the reference indicator of 4 faces the sensor 120, the magnet 220 is not completely located at a front surface of the portable device 100, but is located closer to the front surface. Accordingly, the sensor 120 may detect whether the magnet 220 is located at a front surface or a rear surface of the portable device 100 based on the variation of the magnetic field.

FIG. 7 is a diagram illustrating an example of inserting the pen 200 into the portable device 200 so that the magnet 220 is located at the farthest position away from the sensor 120 according to an exemplary embodiment of the present invention.

The magnet 220 may be located at the farthest position away from the sensor 120 according to the attached state of the pen 200 or rotation of the inserted pen 200. If the magnet 220 is located at the farthest position away from the sensor 120, as illustrated in a third section 30 of FIG. 8, the smallest variation amount of the magnetic field detected by the sensor 120 is provided as compared with a case in which the pen 200 is not inserted. If the variation of the magnetic field is detected, the sensor 120 may generate a control signal according to the detection of the variation of the magnetic field and send the control signal to the controller 130.

Hereinafter, a detailed operation of performing a control operation of the portable device 100 based on the magnetic field varied as the pen 200 is attached and detached according to an exemplary embodiment of the present will be described.

Figure 9:
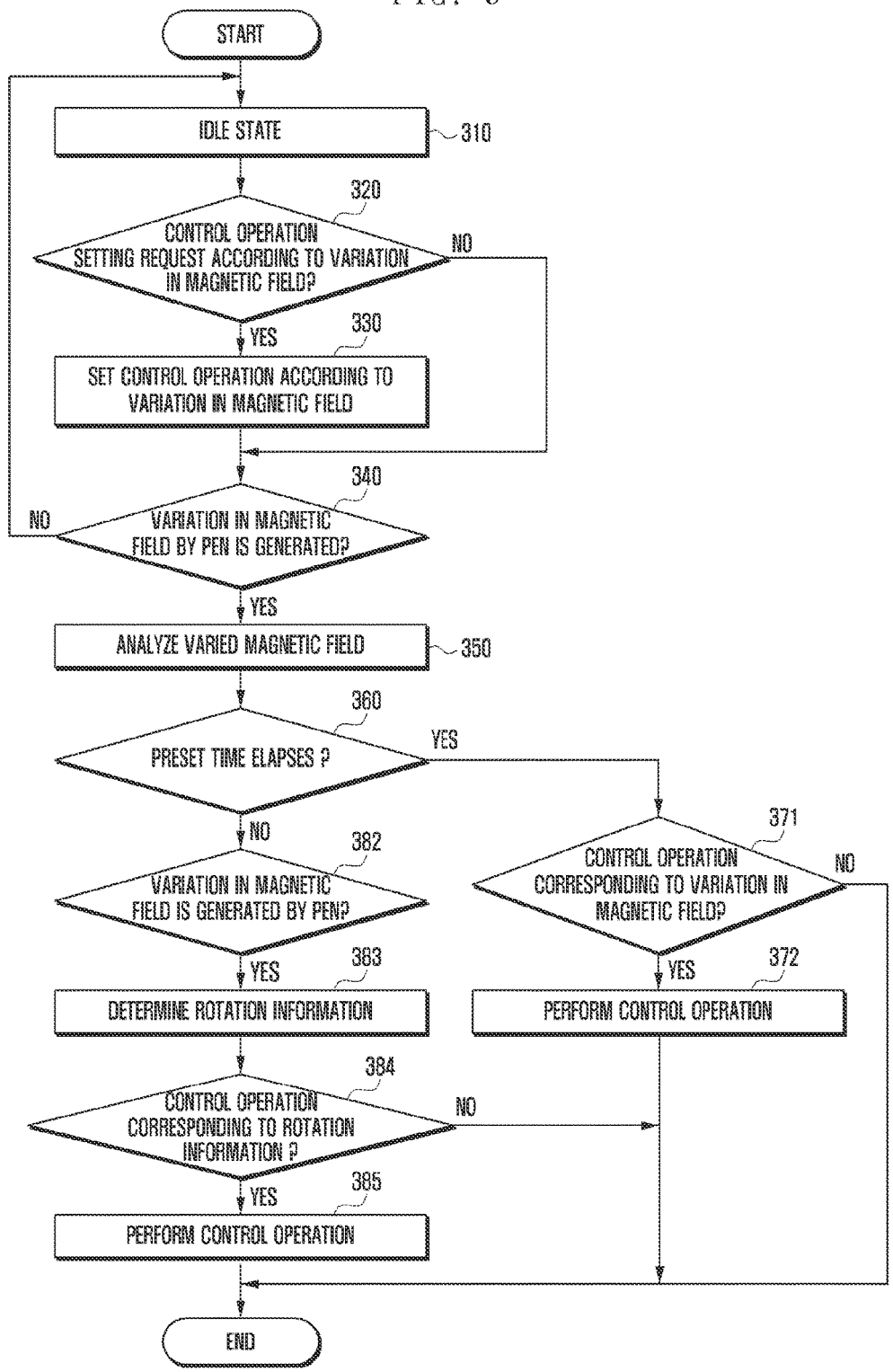
FIG. 9 is a flowchart illustrating a method of controlling a portable terminal according to an exemplary embodiment of the present invention.

FIG. 9 is a flowchart illustrating a method of controlling a portable terminal according to an exemplary embodiment of the present invention.

Hereinafter, the following is a description of exemplary embodiments of the present invention for performing various control operations of the portable device 100 based on the variation of the magnetic field created as the pen 200 is attached and detached. However, exemplary embodiments of the present invention are not limited thereto. For example, exemplary embodiments of the present invention may be applicable to various applications, programs, services, or functions which the portable device 100 may perform.

Referring to FIG. 9, the controller 130 may operate in an idle state in step 310.

In the idle state, the controller 130 may operate in a lock mode or an idle mode, or drive an optional application, program or service.

According to exemplary embodiments of the present invention, the controller 130 may operate in a sleep mode. The controller 130 may control power supplied to respective constituent elements of the portable device 100 so that reduced (e.g., minimum) power is consumed. According to exemplary embodiments of the present invention, when the sensor 120 receives power through a sensor hub, the controller 130 may control the portable device 100 to supply power to the sensor 120 through the sensor hub in a sleep mode.

The controller 130 may control the display unit 150 to display a lock screen in an idle state, an idle screen, or a screen corresponding to a driven application.

Next, the controller 130 may determine whether a control operation setting request according to variation of magnetic field is generated in step 320.

The controller 130 may determine whether the control operation setting request according to variation of magnetic field is generated based on input detected by the sensor 110. The control operation setting request may be generated by selecting an interface such as a menu or an icon for setting a control operation. The control operation setting request may be generated by a quick button or a reset button included in the portable device 100.

If the controller 130 determines that the control operation setting request is not generated in step 320, then the controller 130 proceeds to step 340.

If the controller 130 determines that the control operation setting request is generated in step 320, then the controller 130 proceeds to step 330 in which the controller 130 sets a control operation according to the variation of the magnetic field.

The controller 130 may enter a control operation setting mode in response to the control operation setting request. As the controller 130 enters the control operation setting mode, the controller 130 may control the display unit 150 to display a user interface for setting the control operation.

Figure 10:
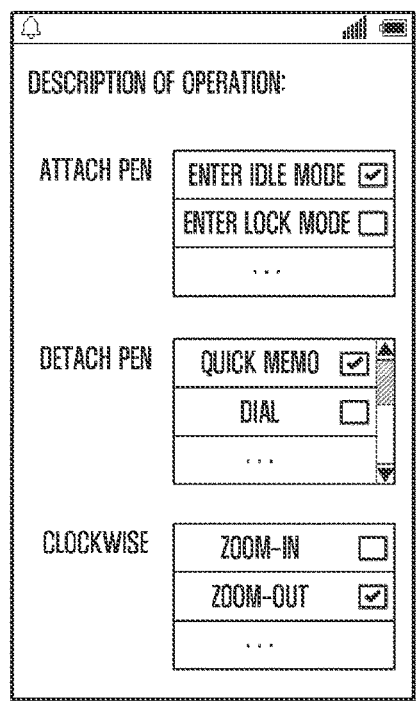
FIG. 10 is a diagram illustrating a diagram illustrating an example of a control operation setting screen according to an exemplary embodiment of the present invention.

FIG. 10 is a diagram illustrating a diagram illustrating an example of a control operation setting screen according to an exemplary embodiment of the present invention.

Referring to FIG. 10, the controller 130 may control the display unit 150 to display a magnetic field variation list listing a case of varying the magnetic field and a control operation list which can be set according the variation of the magnetic field. In this case, the magnetic field variation list or the control operation list may be arranged according to importance or a use frequency.

The magnetic field variation list and the control operation list may be created according to a function, an application, a program, and a service provided from the portable device 100. The magnetic field variation list and the control operation list may be created based on a mode, a function, and a service from a specific application. In this case, the controller 130 may individually set a control operation with respect to at least two applications provided from the portable device 100.

The magnetic field variation list may include at least one of levels of magnetic field according to detaching, attaching, attached state, and rotation of the pen 200. Accordingly, the user may individually set respective control operations corresponding to a variation state of magnetic field.

A default value of a control operation according to the variation of the magnetic field may be provided. The default value may be previously set and stored in the memory 140 upon manufacture of the portable device 100. In the exemplary embodiment of the present invention, when the control operation setting request is generated by a reset button, the controller 130 may set a control operation according to the variation of the magnetic field as the default value.

The controller 130 may set an initial value for performing a control operation according to exemplary embodiments of the present invention in an operation setting mode. In order to perform the control operation according to the variation of the magnetic field, the controller 130 may set intensity of the magnetic field in an initial state to determine presence of the variation of the magnetic field, the intensity or a variation amount of the magnetic field according to an attached state of the pen 200, and the intensity or the variation amount of the magnetic field when the largest variation amount is generated.

The controller 130 may set levels of the magnetic field according to the attached state of the pen or the rotation of the attached pen 200. The controller 130 may set the number of the levels of the magnetic field, and intensities or variation amounts of the magnetic field with respect to respective levels of the magnetic field.

In addition, the controller 130 may set on/off mode of the control operation by the pen 200 according to exemplary embodiments of the present invention. The controller 130 may set on/off mode with respect to whether to control an operation of the portable device 100 according to the variation of the magnetic field by the pen 200. The controller 130 may control the display unit 150 to display a user interface for setting the on/off mode. In this case, the user interface for setting the on/off mode may be displayed on a menu screen, an idle screen or a top curtain GUI on the display unit 150.

Thereafter, the controller 130 determines whether the variation of the magnetic field by the pen 200 is generated in step 340.

Variation of the magnetic field around the portable device 100 may be generated by a human body or the pen 200. For example, the magnetic field around the portable device 100 may vary when a user generates input by a human body or the pen 200 through a display unit 150 implemented by the touch screen. The magnetic field around the portable device 100 may vary when the pen 200 is attached and detached to or from the portable device 100. According to exemplary embodiments of the present invention, the sensor 120 may be configured by a plurality of magnetic field sensors for individually detecting variation of a magnetic field according to a user input and variation of a magnetic field due to attaching and detaching of the pen 200. The sensor 120 may generate a control signal based on information about a magnetic field sensor detecting the variation of the magnetic field, intensity of the magnetic field, and a variation amount of the magnetic field, and send the control signal to the controller 130.

The controller 130 may determine whether the variation of the magnetic field by the pen 200 is generated based on the control signal from the sensor.

If the controller 130 determines that the variation of the magnetic field by the pen 200 is not generated in step 340, the controller 130 may return to step 310 in which the controller is in the idle state and may repeat an operation according to exemplary embodiments of the present invention.

In contrast, if the controller 130 determines that the variation of the magnetic field by the pen 200 is generated in step 340, then the controller 130 proceeds to step 350 in which the controller 130 analyzes information of varied magnetic field.

The controller 130 may determine whether the pen 200 is attached or detached based on the control signal. The controller 130 may determine an attached state or a rotated state of the pen 200. In this case, the controller 130 may determine a level of the magnetic field according to the attached state or the rotated state of the pen 200.

Figure 11:
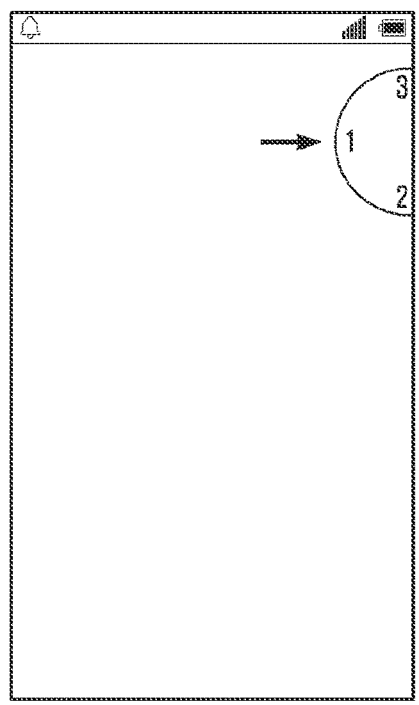
FIG. 11 is a diagram illustrating an example of displaying an image corresponding to variation of a magnetic field according to an exemplary embodiment of the present invention.

FIG. 11 is a diagram illustrating an example of displaying an image corresponding to variation of a magnetic field according to an exemplary embodiment of the present invention.

Referring to FIG. 11, according to exemplary embodiments of the present invention, the controller 130 may control the display unit 150 to display an image, an icon, an indicator, and an alarm window corresponding to the variation of the magnetic field. For example, as shown in FIG. 11, the controller 130 may display an image including the rotated state of the pen 200 and a level of the magnetic field according to the rotation.

Thereafter, the controller 130 may determine whether a preset time elapses in step 360.

The controller 130 may determine whether a preset time elapses after the variation of the magnetic field is generated.

The preset time corresponds to a reference time for determining whether the variation of the magnetic field by the pen 200 is continuously generated, and may be set upon manufacture of the portable device 100 or by the user and stored in the memory 140.

If the controller 130 determines that the preset time elapses in step 360, then the controller 130 proceeds to step 371 in which the controller 130 determines whether a control operation corresponding to the variation of the magnetic field exists.

The controller 130 determines whether there is a control operation corresponding to detaching or attaching of the pen 200, a level of the magnetic field of a detached pen 200, a rotated state of the pen 200, and a level of the magnetic field corresponding to the rotated state.

The control operation corresponding to the variation of the magnetic field may be set by the user according to the foregoing procedure or may be previously set upon manufacture of the portable device 100, and be stored in the memory 140.

According to exemplary embodiments of the present invention, the control operation may be set according to detaching or attaching of the pen 200, a rotated state or a level of magnetic field of an attached pen 200. The controller 130 may determine whether there is the control operation corresponding to the variation of the magnetic field according to a set state of the control operation of the portable device 100.

According to exemplary embodiments of the present invention, the control operation may be set according to an application driven in the portable device 100. The controller 130 may determine whether there is a control operation set for a driven application based on a current driven application.

In contrast, if the controller 130 determines that there is a control operation corresponding to the variation of the magnetic field in step 371, then the controller 130 proceeds to step 372 in which the controller 130 performs a corresponding control operation.

According to exemplary embodiments of the present invention, the controller 130 may drive an application corresponding to the variation of the magnetic field. The controller 130 may perform a specific function of a currently driven or drivable application or set an operation mode of the application.

Figure 12:
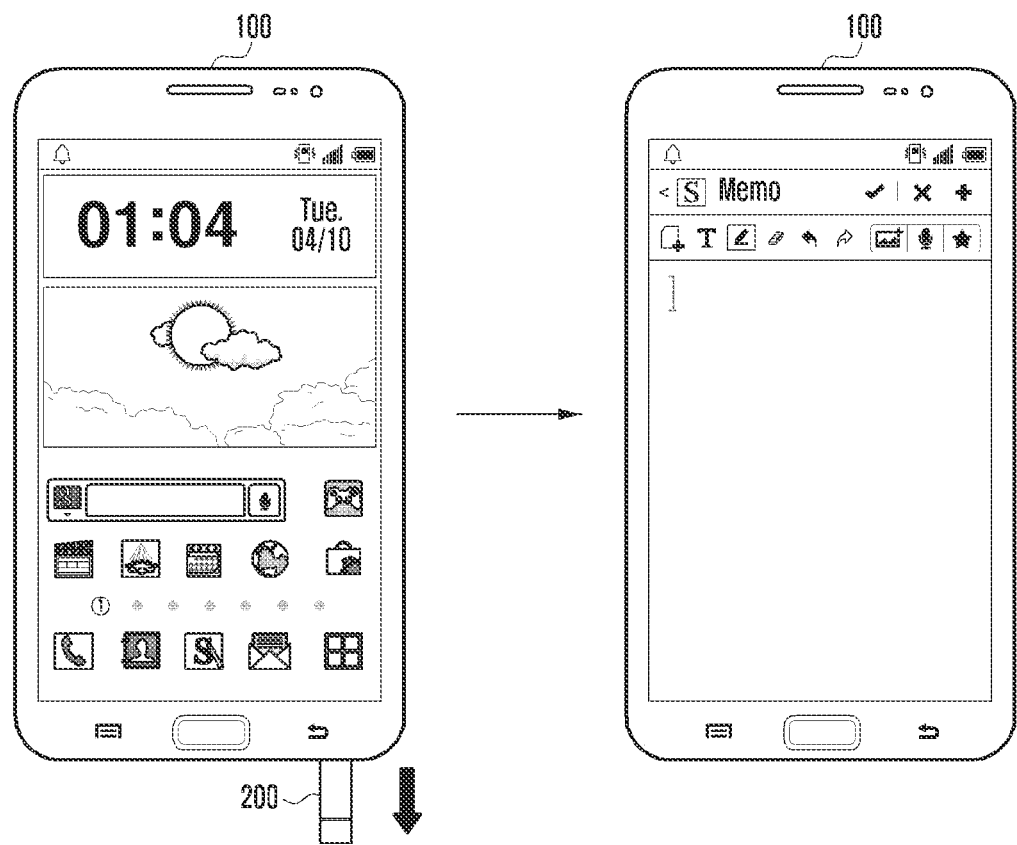
FIG. 12 is a diagram illustrating an example of executing a quick memo function as a pen is detached according to an exemplary embodiment of the present invention.

FIG. 12 is a diagram illustrating an example of executing a quick memo function as a pen is detached according to an exemplary embodiment of the present invention.

Referring to FIG. 12, if the variation of the magnetic field is detected by detaching the pen 120, the controller 130 may drive a quick memo application. In general, because the user detaches the pen 200 included in the portable device 100 to take a note or to take a picture using the pen 200, the controller 130 drives a quick memo application according to detaching of the pen 200 so that convenience of use may be increased.

Figure 13:
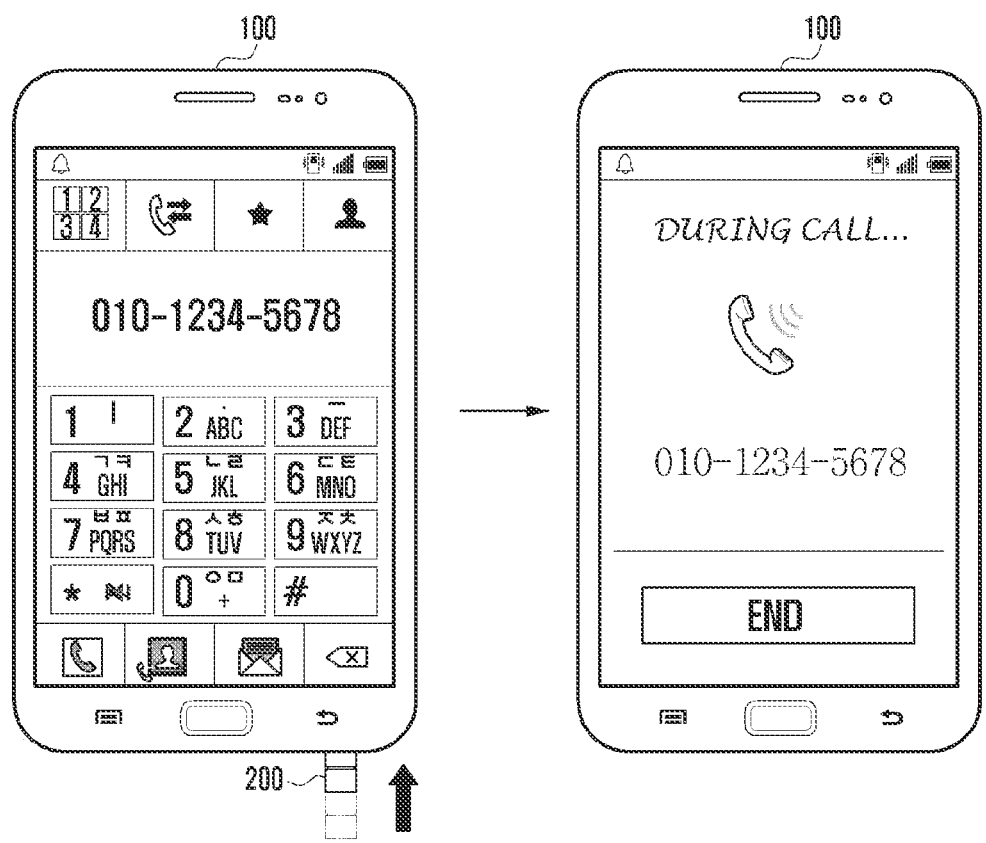
FIG. 13 is a diagram illustrating a diagram illustrating an example of executing a call function by attaching a pen according to an exemplary embodiment of the present invention.

FIG. 13 is a diagram illustrating a diagram illustrating an example of executing a call function by attaching a pen according to an exemplary embodiment of the present invention.

Referring to FIG. 13, if the variation of the magnetic field is detected by detaching the pen 200, the controller 130 may drive a call function. For example, when the user inputs a phone number of the other party for calling using the pen 200, and attaches the pen 200 to the portable device 200 to generate variation of the magnetic field, the controller 130 may drive the call function so that a call is requested to the other party using an input phone number.

In addition, when the variation of the magnetic field is detected due to detaching of the pen 200 during driving of the image display or the document view application, the controller 130 may perform an image edit function or a document edit function. When the variation of the magnetic field is detected due to a detaching of the pen 200 during the calling, the controller 130 may execute a memo function.

Further, the controller 130 may perform various control operations such as selection of a specific menu, mode entry, and file playing, in response to the variation of the magnetic field due to attaching or detaching of the pen 200.

When the pen 200 is attached to the portable device 100, the controller 130 may perform a control operation according to the intensity or a variation amount of the magnetic field, for example, a level of the magnetic field according to an attached state or a rotation state of the pen.

According to exemplary embodiments of the present invention, the controller 130 may execute functions such as file attachment, emoticon addition, and message transmission according to the level of the magnetic field during driving of a memo application, a character application or an SNS application.

According to exemplary embodiments of the present invention, the controller 130 may execute functions such as sound removal, a speaker phone, and an image call according to the level of the magnetic field during driving of the call application.

According to exemplary embodiments of the present invention, the controller 130 may execute functions such as moving image mode conversion, filter application, automatic focusing, and timer setting according to the level of the magnetic field during driving of a camera application.

According to exemplary embodiments of the present invention, the controller 130 may perform mode conversion between a general calculator and a scientific calculator according to the level of the magnetic field during the driving of the calculator application.

Further, the controller 130 may perform various operations such as function execution or mode setting according to the intensity or the variation amount of the magnetic field, for example, the level of the magnetic field according to the attached state or the rotated state of the pen 200.

According to exemplary embodiments of the present invention, the controller 130 may perform a control operation according to the variation of the magnetic field by the pen 200 during an operation in a sleep mode. When the variation of the magnetic field is detected through the sensor 120 in the sleep mode, the controller 130 releases the sleep mode in response to the detected variation of the magnetic field and performs a corresponding operation. In this case, the sensor 120 may receive power in the sleep mode through the sensor hub.

For example, when the variation of the magnetic field is detected due to detaching of the pen 200 in the sleep mode, the controller 130 may release the sleep mode and a lock mode. The controller 130 may, according to the detected level of the magnetic field, drive a character application, a camera application, a call application, and a schedule application while releasing the sleep mode.

In contrast, if the controller 130 determines that there is no control operation corresponding to the variation of the magnetic field in step 371, the controller 130 may terminate a control procedure according to exemplary embodiments of the present invention.

If the controller 130 determines that the preset time does not elapse in step 360, then the controller 130 proceeds to step 382 in which the controller 130 may determine whether the variation of the magnetic field is generated by the pen 200.

The controller 130 may determine whether the variation of the magnetic field by the pen 200 is further generated before the preset time elapses. A detailed operation of detecting the variation of the magnetic field is described above.

If the controller 130 determines that the variation of the magnetic field by the pen 200 is generated, then the controller 130 proceeds to step 383 in which the controller 130 determines rotation information.

The controller 130 determines the rotation information of the pen 200 based on a currently detected variation of magnetic field and an additionally generated variation of magnetic field.

In detail, the controller 130 may determine a rotation direction of the pen 200. For example, as shown in FIG. 5, after the pen 200 is inserted into the portable device 100 so that the variation of the magnetic field is detected during a first period 10 of FIG. 8, when the pen 200 is rotated in a state as shown in FIG. 6 so that the variation of the magnetic field is detected during a second period 20, the controller 130 may determine that the pen 200 is rotated clockwise.

In contrast, after the pen 200 is inserted into the portable device 100 shown in FIG. 7 so that the variation of the magnetic field is detected during a third period 30 of FIG. 8, when the pen 200 is rotated in a state as shown in FIG. 6 so that the variation of the magnetic field is detected during a second period 20 of FIG. 8, the controller 130 may determine that the pen 200 is rotated counterclockwise.

The controller 130 may determine the intensity or the variation amount of the magnetic field and the level of the magnetic field changed due to the rotation. The controller 130 may determine an angle by which the pen 200 is rotated or the number of times by which the pen is rotated 360 degrees.

Next, the controller 130 determines whether there is a control operation corresponding to rotation information in step 384.

The controller 130 determines whether there is the control operation corresponding to the rotation information based on the determined rotation information.

The control operation corresponding to the rotation information may be set by the user according to the foregoing procedure or may be previously set upon manufacture of the portable device 100 and be stored in the memory 140. According to exemplary embodiments of the present invention, the control operation may be set according to a rotation direction and a level of a magnetic field after rotation.

According to exemplary embodiments of the present invention, the control operation may be set according to the application driven by the portable device 100. The controller 130 may determine whether there is a control operation set for the driven application based on a current driven application.

If the controller 130 determines there is the control operation corresponding to the rotation information, then the controller 130 proceeds to step 385 in which the controller 130 performs the control operation.

According to exemplary embodiments of the present invention, the controller 130 may perform an operation corresponding to the rotation direction or the level of the magnetic field after rotation included in the rotation information. The controller 130 may execute a specific function of the application or an operation mode of the application with respect to a currently driven or a drivable application.

For example, during driving a web browser application, when the variation of the magnetic field due to the rotation of the pen 200 is detected, the controller 130 may perform an operation controlling scroll of a web browser according to the rotation direction. When the pen 200 is rotated clockwise, the controller 130 downs a scroll of the web browser. When the pen 200 is rotated counterclockwise, the controller 130 raises the scroll of the web browser. During driving of the camera application, when the variation of the magnetic field is detected due to rotation of the pen 200, the controller 130 may control zoom-in/zoom-out function of the camera according to the rotation direction. Similarly, when the variation of the magnetic field is detected due to the rotation of the pen 200 during driving of the document or image viewer application, the controller 130 may control zoom-in/zoom-out of a screen displayed according to the rotation direction.

When the variation of the magnetic field is detected due to the rotation of the pen 200 during driving of a contents playing application (e.g., a music playing application, a moving image playing application, a broadcasting playing application, and the like), the controller 130 may perform operations such as volume control, playing file selection, fast forward/rewinding control, and playing speed control according to the rotation direction or a level of a magnetic field after rotation.

Further, the controller 130 may perform various operations such as function execution or mode setting in response to the variation of the magnetic field due to the rotation of the pen 200.

Conversely, if the controller 130 determines that there is no operation corresponding to the variation of the magnetic field in step 384, then the controller 130 may terminate the control operation according to exemplary embodiments of the present invention.

The method of controlling the portable device and a portable device thereof according to exemplary embodiments of the present invention can conveniently control various functions of the portable device in a portable device to which a pen is detachably attached without adding a separate button or switch. In the method of controlling the portable device and a portable device thereof according to exemplary embodiments of the present invention, a detachable pen used for preventing loss can be used as various applications for controlling the portable device.

It will be appreciated that exemplary embodiments of the present invention according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments provide a program comprising code for implementing apparatus or a method as claimed in any one of the claims of this specification and a machine-readable storage storing such a program.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of controlling a portable device to which a pen is detachably attached, the method comprising:
    detecting a variation of a magnetic field due to a rotation of the pen, the variation of the magnetic field occurring based on a change in a distance between a magnet disposed within the pen and a sensor disposed within the portable device;
    identifying a control operation corresponding to the detected variation of the magnetic field; and
    performing the control operation in the portable device,
    wherein the performing of the control operation comprises performing at least one of driving a specific application, executing a function provided to an application, or setting a mode for an application.

2. The method of claim 1, further comprising:
    receiving the control operation according to the variation of the magnetic field when a control operation setting request corresponding to the variation of the magnetic field is generated; and
    setting the control operation corresponding to the variation of the magnetic field according to the reception of the control operation.

3. The method of claim 2, wherein the setting of the control operation comprises setting the control operation corresponding to the variation of the magnetic field according to a preset initial value when the control operation setting request corresponds to a reset request.

4. The method of claim 1, wherein the detecting of the variation of the magnetic field comprises displaying an indicator corresponding to the variation of the magnetic field.

5. The method of claim 1, wherein the identifying of the control operation corresponding to the variation of the magnetic field comprises:
    determining the variation of the magnetic field; and
    determining at least one of an intensity of the magnetic field, a variation amount of the magnetic field, a detaching of the pen, an attaching of the pen, a detached state of the pen, rotation information of the pen, or a level of the magnetic field of the pen, according to the determined variation of the magnetic field.

6. The method of claim 5, wherein the identifying of the control operation corresponding to the variation of the magnetic field comprises:
    determining whether a preset time elapses after the variation of the magnetic field is detected; and
    determining, when the preset time elapses, whether a control operation corresponding to the variation of the magnetic field exists.

7. The method of claim 5, wherein the identifying of the control operation corresponding to the variation of the magnetic field comprises:
- determining, when a preset time has not elapsed, whether a variation of a new magnetic field is generated by the pen;
- determining, when the variation of the new magnetic field is generated, the rotation information of the pen based on the variation of the magnetic field and the variation of the new magnetic field; and
- determining whether the control operation corresponding to the rotation information of the pen exists.

8. The method of claim 1, wherein the identifying of the control operation corresponding to the variation of the magnetic field comprises:
- determining a currently driven application; and
- determining whether a control operation corresponding to the variation of the magnetic field exists with respect to the currently driven application.

9. The method of claim 1, wherein the detecting of the variation of the magnetic field comprises:
- entering a sleep mode;
- driving a sensor hub according to the entering of the sleep mode to supply power to the sensor; and
- detecting the variation of the magnetic field by the sensor.

10. A non-transient computer-readable storage medium storing instructions that when executed cause at least one processor to perform the method of claim 1.

11. The method of claim 1, further comprising:
- analyzing the detected variation of the magnetic field; and
- determining, according to a result of the analyzing of the detected variation of the magnetic field, at least one of a variation amount of the magnetic field, attaching or detaching of the pen, a detached state of the pen, or rotation information of the pen.

12. A portable device to which a pen is detachably attached, the portable device comprising:
- a hole in which the pen is detachably attached and which is formed to allow the pen to be rotated when the pen is in an attached state;
- a sensor installed in proximity to the hole and configured to detect a variation of a magnetic field due to a rotation of the pen, the variation of the magnetic field occurring based on a change in a distance between a magnet disposed within the pen and the sensor; and
- at least one processor configured to:
  - identify a control operation corresponding to the variation of the magnetic field detected by the sensor, and
  - perform the control operation in the portable device,
- wherein the performing of the control operation comprises performing at least one of driving a specific application, executing a function provided to an application, or setting a mode for an application.

13. The portable device of claim 12, further comprising:
- an interface configured to receive a control operation setting request and a control operation corresponding to the variation of the magnetic field,
- wherein the at least one processor is further configured to set the control operation corresponding to the variation of the magnetic field according to the received control operation when the control operation setting request is received through the interface.

14. The portable device of claim 13, further comprising a reset button for setting the control operation according to a preset initial value,
- wherein the at least one processor is further configured to set the control operation corresponding to the variation of the magnetic field according to the preset initial value when the reset button is operated.

15. The portable device of claim 12, further comprising a display configured to display an indicator corresponding to the variation of the magnetic field when the variation of the magnetic field is detected.

16. The portable device of claim 12, wherein the at least one processor is further configured to:
- determine the variation of the magnetic field, and
- determine at least one of an intensity of the magnetic field, a variation amount of the magnetic field, a detaching of the pen, an attaching of the pen, a detached state of the pen, rotation information, or a level of the magnetic field in the pen according to the determined variation of the magnetic field.

17. The portable device of claim 16, wherein the at least one processor is further configured to:
- determine whether a preset time elapses after the variation of the magnetic field is detected, and
- determine, when the preset time elapses, whether a control operation corresponding to the variation of the magnetic field exists.

18. The portable device of claim 16, wherein the at least one processor is further configured to:
- determine, when a preset time has not elapsed, whether a variation of a new magnetic field by the pen is generated,
- determine, when the variation of the new magnetic field is generated, the rotation information of the pen based on the variation of the magnetic field and the variation of the new magnetic field, and
- determine whether the control operation corresponding to the rotation information exists.

19. The portable device of claim 12, further comprising:
- a sensor hub configured to supply power to the sensor when the at least one processor controls the portable device so that the portable device operates in a sleep mode,
- wherein the sensor receives the power from the sensor hub when the portable device operates in the sleep mode to detect the variation of the magnetic field.

20. The portable device of claim 12,
- wherein the magnet is installed in a location biased to one surface from a center axis of a pen holder, and
- wherein the pen comprises a dial configured to rotate the pen and the magnet installed at the pen.

* * * * *